US008894531B2

(12) United States Patent
Noh et al.

(10) Patent No.: US 8,894,531 B2
(45) Date of Patent: Nov. 25, 2014

(54) PLANETARY GEAR TRAIN OF AUTOMATIC TRANSMISSION FOR VEHICLES

(71) Applicant: Hyundai Motor Company, Seoul (KR)

(72) Inventors: Myonghoon Noh, Seongnam-si (KR); Hyu Tae Shim, Hwaseong-si (KR); Kangsoo Seo, Yongin-si (KR); Jae Chang Kook, Hwaseong-si (KR); Chang Wook Lee, Suwon-si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/065,251

(22) Filed: Oct. 28, 2013

(65) Prior Publication Data

US 2014/0128208 A1 May 8, 2014

(30) Foreign Application Priority Data

Nov. 5, 2012 (KR) ........................ 10-2012-0124112

(51) Int. Cl.
*F16H 37/02* (2006.01)
*F16H 3/44* (2006.01)
*F16H 3/62* (2006.01)

(52) U.S. Cl.
CPC ....................................... *F16H 3/62* (2013.01)
USPC ............................. 475/214; 475/219; 475/302

(58) Field of Classification Search
CPC ................. F16H 2200/201; F16H 2200/2097; F16H 2037/047; F16H 2037/048
USPC ........................... 475/214, 215, 218, 219, 302
See application file for complete search history.

(56) References Cited

U.S. PATENT DOCUMENTS

| 7,695,391 | B2 | 4/2010 | Phillips et al. | |
|---|---|---|---|---|
| 7,857,726 | B2 | 12/2010 | Borgerson | |
| 7,896,772 | B2* | 3/2011 | Wittkopp et al. | 475/275 |
| 8,047,945 | B2* | 11/2011 | Wittkopp et al. | 475/219 |
| 8,066,612 | B2* | 11/2011 | Phillips et al. | 475/302 |
| 8,083,633 | B2 | 12/2011 | Wittkopp et al. | |
| 8,100,801 | B2 | 1/2012 | Wittkopp et al. | |
| 8,157,688 | B2* | 4/2012 | Wittkopp et al. | 475/15 |
| 2010/0248891 | A1* | 9/2010 | Wittkopp et al. | 477/3 |

FOREIGN PATENT DOCUMENTS

| JP | 2005-42790 A | 2/2005 |
|---|---|---|
| JP | 2007-78021 A | 3/2007 |
| JP | 2010-7709 A | 1/2010 |
| KR | 10-2006-0073772 A | 6/2006 |

* cited by examiner

*Primary Examiner* — Tisha Lewis
(74) *Attorney, Agent, or Firm* — Morgan, Lewis & Bockius LLP

(57) ABSTRACT

A planetary gear train including: a first planetary gear set on a first shaft including a first sun gear operated as an output or fixed element, a first planet carrier operable as an output element, and a first ring gear operated as an input element; a second planetary gear set on a second shaft including a second sun gear connected to the first planet carrier, a second planet carrier, and a second ring gear engaging the first planet carrier and the first ring gear; a third planetary gear set on the second shaft including a third sun gear connected to the second ring gear, a third planet carrier engaging the second planet carrier and connected to an output gear, and a third ring gear engaging the first sun gear; three transfer gears; and frictional elements interconnecting the first, second, and third planetary gear sets and/or connecting a transmission housing.

8 Claims, 11 Drawing Sheets

FIG.2

|  | B1 | C1 | C2 | C3 | C4 | Gear ratio |
|---|---|---|---|---|---|---|
| 1ST | ● | ● |  |  | ● | 4.500 |
| 2ND | ● | ● | ● |  |  | 2.996 |
| 3RD |  | ● | ● |  | ● | 2.020 |
| 4TH |  | ● | ● | ● |  | 1.618 |
| 5TH |  | ● |  | ● | ● | 1.272 |
| 6TH |  |  | ● | ● | ● | 1.000 |
| 7TH | ● |  |  | ● | ● | 0.833 |
| 8TH | ● |  | ● | ● |  | 0.666 |
| Rev | ● | ● |  | ● |  | −2.830 |

PLANETARY GEAR TRAIN OF AUTOMATIC TRANSMISSION FOR VEHICLES

CROSS-REFERENCE TO RELATED APPLICATION

The present application claims priority of Korean Patent Application Number 10-2012-0124112 filed Nov. 5, 2012, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability by reducing a length thereof and reduce fuel consumption by improving power delivery performance.

2. Description of Related Art

Recently, vehicle makers direct all their strength to improve fuel economy due to worldwide high oil prices and strengthen of exhaust gas regulations.

Improvement of fuel economy may be achieved by multi-shift mechanism realizing greater number of shift speeds in an automatic transmission. Typically, a planetary gear train is realized by combining a plurality of planetary gear sets and friction elements.

It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a planetary gear train of an automatic transmission for a vehicle having advantages of improving mountability by shortening a length thereof and reducing fuel consumption by improving power delivery performance as a consequence of achieving eight forward speeds and one reverse speed having excellent operating condition of frictional elements and step ratios by combining three planetary gear sets separately disposed on a first shaft and a second shaft, three externally-meshing gears, and five frictional elements.

Various aspects of the present invention provide for a planetary gear train of an automatic transmission including: a first shaft receiving torque of an engine; a second shaft disposed in parallel with the first shaft; a first planetary gear set disposed on the first shaft, and including a first sun gear operated as an output element or a fixed element, a first planet carrier selectively operated as an output element, and a first ring gear directly connected to the first shaft and always operated as an input element as rotation elements thereof; a second planetary gear set disposed on the second shaft, and including a second sun gear connected to the first planet carrier through an externally-meshed gear, a second planet carrier, and a second ring gear selectively connected to the first planet carrier and the first ring gear through externally-meshed gears as rotation elements thereof; a third planetary gear set disposed on the second shaft, and including a third sun gear connected to the second ring gear, a third planet carrier selectively connected to the second planet carrier and directly connected to an output gear so as to be operated as an output element, and a third ring gear selectively connected to the first sun gear through an externally-meshed gear as rotation elements thereof; three transfer gears forming the externally-meshed gears; and frictional elements selectively interconnecting the rotation elements of the first, second, and third planetary gear sets or selectively connecting the rotation element to a transmission housing.

The first planetary gear set may be a double pinion planetary gear set, and the second and third planetary gear sets may be single pinion planetary gear sets.

The three transfer gears may include: a first transfer gear connecting the first ring gear to the second ring gear; a second transfer gear connecting the first planet carrier directly to the second sun gear and selectively to the second ring gear; and a third transfer gear selectively connecting the first sun gear to the third ring gear.

The frictional elements may include: a first brake disposed between the first sun gear and the transmission housing; a first clutch disposed between the first sun gear and the third transfer gear; a second clutch disposed between the second transfer gear and the second ring gear; a third clutch disposed between the second planet carrier and the third planet carrier; and a fourth clutch disposed between the first transfer gear and the second ring gear.

The first brake and the first and fourth clutches may be operated at a first forward speed, the first brake and the first and second clutches may be operated at a second forward speed, the first, second, and fourth clutches may be operated at a third forward speed, the first, second, and third clutches may be operated at a fourth forward speed, the first, third, and fourth clutches may be operated at a fifth forward speed, the second, third, and fourth clutches may be operated at a sixth forward speed, the first brake and the third and fourth clutches may be operated at a seventh forward speed, the first brake and the second and third clutches may be operated at an eighth forward speed, and the first brake and the first and third clutches may be operated at a reverse speed.

Various aspects of the present invention provide for a planetary gear train of an automatic transmission for a vehicle including: a first shaft receiving torque of an engine; a second shaft disposed in parallel with the first shaft; a first planetary gear set disposed on the first shaft, and including a first sun gear operated as an output element or a fixed element, a first planet carrier selectively operated as an output element, and a first ring gear directly connected to the first shaft and always operated as an input element; a second planetary gear set disposed on the second shaft, and including a second sun gear connected to the first planet carrier, a second planet carrier, and a second ring gear selectively connected to the first planet carrier and the first ring gear; a third planetary gear set disposed on the second shaft, and including a third sun gear connected to the second ring gear, a third planet carrier selectively connected to the second planet carrier and directly connected to an output gear so as to be operated as an output element, and a third ring gear selectively connected to the first sun gear; a first transfer gear connecting the first ring gear to the second ring gear; a second transfer gear connecting the first planet carrier directly to the second sun gear and selectively to the second ring gear; a third transfer gear selectively connecting the first sun gear to the third ring gear; a first brake disposed between the first sun gear and the transmission housing; a first clutch disposed between the first sun gear and the third transfer gear; a second clutch disposed between the second transfer gear and the second ring gear; a third clutch disposed between the second planet carrier and the third planet carrier; and a fourth clutch disposed between the first transfer gear and the second ring gear.

The first planetary gear set may be a double pinion planetary gear set, and the second and third planetary gear sets may be single pinion planetary gear sets.

The first brake and the first and fourth clutches may be operated at a first forward speed, the first brake and the first and second clutches may be operated at a second forward speed, the first, second, and fourth clutches may be operated at a third forward speed, the first, second, and third clutches may be operated at a fourth forward speed, the first, third, and fourth clutches may be operated at a fifth forward speed, the second, third, and fourth clutches may be operated at a sixth forward speed, the first brake and the third and fourth clutches may be operated at a seventh forward speed, the first brake and the second and third clutches may be operated at an eighth forward speed, and the first brake and the first and third clutches may be operated at a reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to an exemplary planetary gear train according to the present invention.

DETAILED DESCRIPTION

Figure 1:
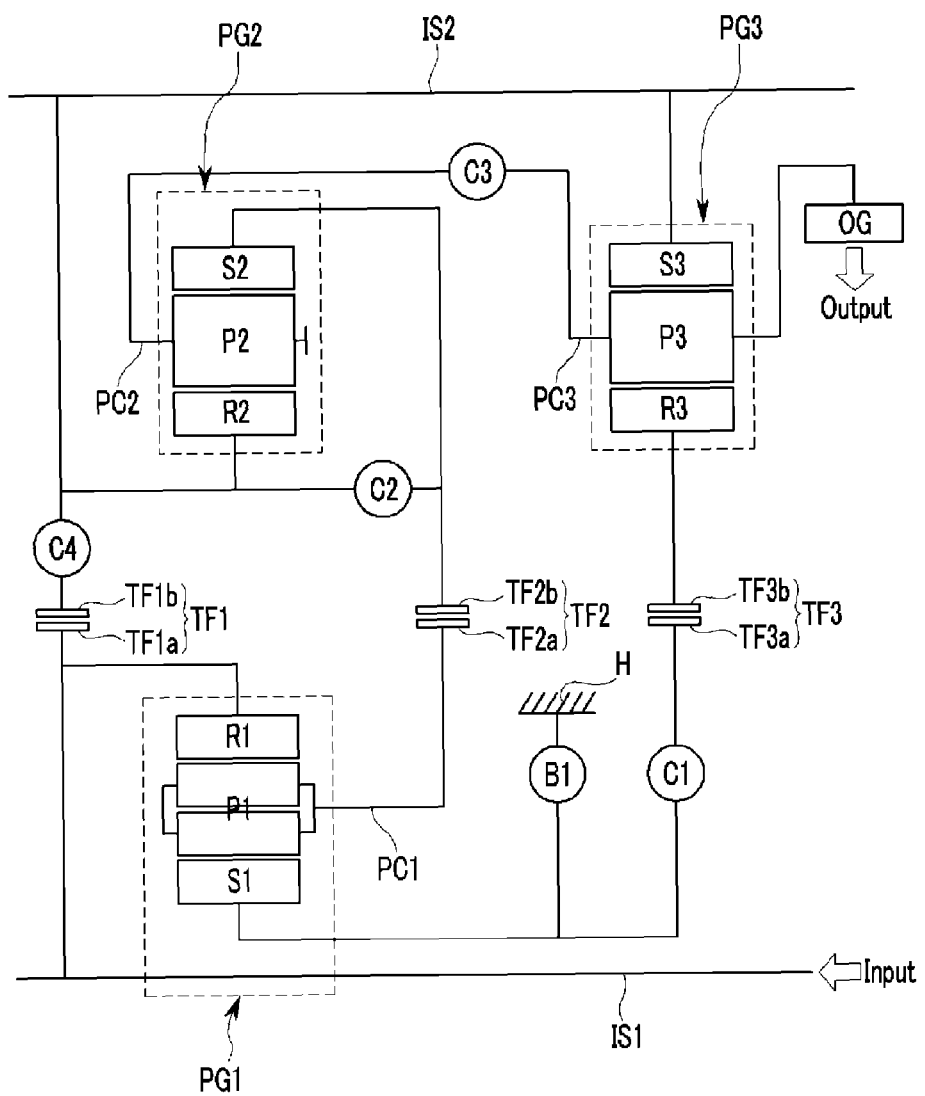
FIG. 1 is a schematic diagram of an exemplary planetary gear train according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to various embodiments of the present invention.

Referring to FIG. 1, a planetary gear train according to various embodiments of the present invention includes first, second, and third planetary gear sets PG1, PG2, and PG3, five frictional elements B1, C1, C2, C3, and C4, and three transfer gears TF1, TF2, and TF3.

The first planetary gear set PG1 is disposed on a first shaft IS1, and the second and third planetary gear sets PG2 and PG3 are disposed on a second shaft IS2 disposed apart from and in parallel with the first shaft IS1.

Therefore, torque input from the first shaft IS1 is transmitted to the second and third planetary gear sets PG2 and PG3 through the first planetary gear set PG1, is converted into eight forward speeds and one reverse speed by operations of the first, second, and third planetary gear sets PG1, PG2, and PG3, and is then output through an output gear OG.

The first planetary gear set PG1 is a double pinion planetary gear set, and having a first sun gear S1, a first ring gear R1, and a first planet carrier PC1 rotatably supporting a first pinion P1 engaged with the first sun gear S1 and the first ring gear R1 as rotation elements thereof.

The second planetary gear set PG2 is a single pinion planetary gear set, and having a second sun gear S2, a second ring gear R2, and a second planet carrier PC2 rotatably supporting a second pinion P2 engaged with the second sun gear S2 and the second ring gear R2 as rotation elements thereof.

The third planetary gear set PG3 is a single pinion planetary gear set, and having a third sun gear S3, a third ring gear R3, and a third planet carrier PC3 rotatably supporting a third pinion P3 engaged with the third sun gear S3 and the third ring gear R3 as rotation elements thereof.

The first ring gear R1 is directly connected to the first shaft IS1 and is always operated as an input element.

In addition, the second ring gear R2 is connected to the third sun gear S3 through the second shaft IS2, the second planet carrier PC2 is selectively connected to the third planet carrier PC3, and the third planet carrier PC3 is directly connected to an output gear OG and is always operated as an output element.

It is illustrated, but is not limited, that the second ring gear R2 is connected to the third sun gear S3 through the second shaft IS2. That is, the second ring gear R2 may be connected to the third sun gear S3 through a rotating member disposed on an external circumferential portion of the second shaft IS2 without rotational interference between the rotating member and the second shaft IS2.

In addition, the first ring gear R1 as well as the first shaft IS1 is selectively connected to the second ring gear R2 through an externally-meshed gear, the first sun gear S1 is selectively connected to the third ring gear R3 through an externally-meshed gear and is selectively connected to a transmission housing H, and the first planet carrier PC1 is connected to the second sun gear S2 and is selectively connected to the second ring gear R2 through an externally-meshed gear.

The first, second, and third transfer gears TF1, TF2, and TF3, being the externally-meshed gears, may be helical gears and respectively have first, second, and third transfer drive gears TF1a, TF2a, and TF3a and first, second, and third transfer driven gears TF1b, TF2b, and TF3b externally meshed with each other.

The first transfer gear TF1 includes the first transfer drive gear TF1a directly connected to the first ring gear R1 and the first transfer driven gear TF1b selectively connected to the second ring gear R2.

Therefore, the first transfer gear TF1 selectively connects the first ring gear R1 to the second ring gear R2.

The second transfer gear TF2 includes the second transfer drive gear TF2a directly connected to the first planet carrier PC1 and the second transfer driven gear TF2b directly connected to the second sun gear S2 and selectively connected to the second ring gear R2.

Therefore, the second transfer gear TF2 connects the first planet carrier PC1 directly to the second sun gear S2 and selectively to the second ring gear R2.

The third transfer gear TF3 includes the third transfer drive gear TF3a selectively connected to the first sun gear S1 and the third transfer driven gear TF3b directly connected to the third ring gear R3.

Therefore, the third transfer gear TF3 selectively connects the first sun gear S1 to the third ring gear R3.

The rotation elements connected to each other by the first, second, and third transfer gears TF1, TF2, and TF3 are rotated in opposite direction to each other. Gear ratios of the first, second, and third transfer gears TF1, TF2, and TF3 are set according to speed ratios demanded at shift-speeds.

Arrangements of the frictional elements B1, C1, C2, C3, and C4 will be described in detail.

The first brake B1 is disposed between the first sun gear S1 and the transmission housing H.

The first clutch C1 is disposed between the first sun gear S1 and the third transfer gear TF3.

The second clutch C2 is disposed between the second transfer gear TF2 and the second ring gear R2.

The third clutch C3 is disposed between the second planet carrier PC2 and the third planet carrier PC3.

The fourth clutch C4 is disposed between the first transfer gear TF1 and the second ring gear R2.

The frictional elements consisting of the first, second, third, and fourth clutches C1, C2, C3, and C4 and the first brake B1 are conventional multi-plate friction elements of wet type that are operated by hydraulic pressure.

FIG. 2 is an operational chart of friction members at each shift-speed applied to a planetary gear train according to various embodiments of the present invention.

As shown in FIG. 2, three frictional elements are operated at each shift-speed in the planetary gear train according to various embodiments of the present invention.

The first brake B1 and the first and fourth clutches C1 and C4 are operated at a first forward speed $1^{ST}$.

The first brake B1 and the first and second clutches C1 and C2 are operated at a second forward speed $2^{ND}$.

The first, second, and fourth clutches C1, C2, and C4 are operated at a third forward speed $3^{RD}$.

The first, second, and third clutches C1, C2, and C3 are operated at a fourth forward speed $4^{TH}$.

The first, third, and fourth clutches C1, C3, and C4 are operated at a fifth forward speed $5^{TH}$.

The second, third, and fourth clutches C2, C3, and C4 are operated at a sixth forward speed $6^{TH}$.

The first brake B1 and the third and fourth clutches C3 and C4 are operated at a seventh forward speed $7^{TH}$.

The first brake B1 and the second and third clutches C2 and C3 are operated at an eighth forward speed $8^{TH}$.

The first brake B1 and the first and third clutches C1 and C3 are operated at a reverse speed Rev.

FIG. 3A to FIG. 3I are lever diagrams of the planetary gear train at each shift-speed according to various embodiments of the present invention, and illustrate shift processes of the planetary gear train according to the various embodiments of the present invention by lever analysis method.

Referring to FIG. 3A to FIG. 3I, three vertical lines of the first planetary gear set PG1 are set as the first sun gear S1 being a first rotation element N1, the first ring gear R1 being a second rotation element N2, and the first planet carrier PC1 being a third rotation element N3 from the left to the right.

In addition, the second and third planetary gear sets PG2 and PG3 are operated as a selective compound planetary gear set according to operation of the third clutch C3. Four vertical lines of the second and third planetary gear sets PG2 and PG3 are set as the second sun gear S2 being a fourth rotation element N4, the third ring gear R3 being a fifth rotation element N5, the third planet carrier PC3 or the second planet carrier PC2 and the third planet carrier PC3 being a sixth rotation element N6, and the second ring gear R2 and the third sun gear S3 being a seventh rotation element N7 from the left to the right.

Since the third clutch C3 is not operated from the first forward speed to the third forward speed, the third planet carrier PC3 is set as the sixth rotation element N6. Since the third clutch C3 is operated from the fourth forward speed to the eighth forward speed and at the reverse speed, however, the second and third planet carriers PC2 and PC3 are set as the sixth rotation element N6.

In addition, a middle horizontal line represents a rotation speed of "0", an upper horizontal line represents a rotation speed of "1.0", and a lower horizontal line represents a rotation speed of "−1.0".

"−" means that rotational elements is rotated in an opposite direction of a rotational direction of the engine. It is because the rotation elements are externally meshed with each other through the first, second, and third transfer gears TF1, TF2, and TF3 without an idling gear.

In addition, the rotation speed of "1.0" represents the same rotational speed as the first shaft IS 1 which is an input shaft. Distances between the vertical lines of the first, second, and third planetary gear sets PG1, PG2, and PG3 are set according to each gear ratio (teeth number of a sun gear/teeth number of a ring gear).

Hereinafter, referring to FIG. 2 and FIG. 3A to FIG. 3I, the shift processes of the planetary gear train according to various embodiments of the present invention will be described in detail.

First Forward Speed

Referring to FIG. 2, the first brake B1 and the first and fourth clutches C1 and C4 are operated at the first forward speed $1^{ST}$.

Figure 3A:
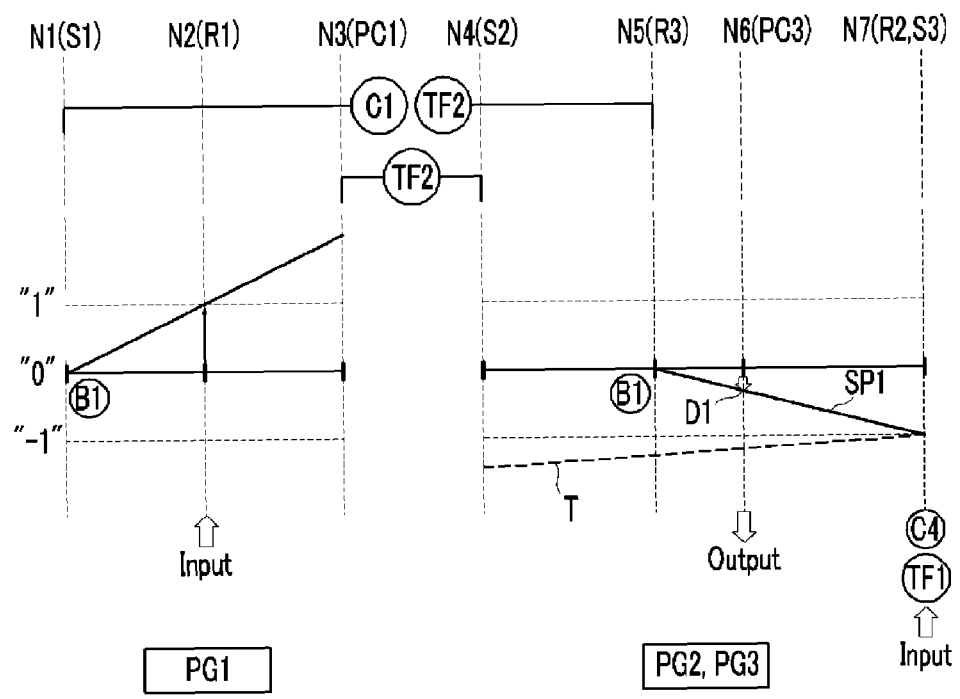
FIG. 3A is a lever diagram of an exemplary planetary gear train at the first forward speed according to the present invention.

As shown in FIG. 3A, a rotation speed of the first shaft IS1 is input to the second rotation element N2, and the first rotation element N1 and the fifth rotation element N5 are operated as fixed elements by operation of the first brake B1 and the first clutch C1.

Therefore, a rotation speed of the third rotation element N3 is decreased according to the gear ratio of the second transfer gear TF2 and is then input to the fourth rotation element N4 as an inverse rotation speed, and the rotation speed of the first shaft IS1 is converted according to the gear ratio of the first transfer gear TF1 by operation of the fourth clutch C4 and is then input to the seventh rotation element N7 as an inverse rotation speed.

Therefore, the rotation elements of the third planetary gear set PG3 form a first shift line SP1 and D1 is output through the sixth rotation element N6 that is the output element.

At this time, the rotation elements of the second planetary gear set PG2 form a thick dotted line T, but it does not have any effect on shifting.

Second Forward Speed

The fourth clutch C4 that was operated at the first forward speed $1^{ST}$ is released and the second clutch C2 is operated at the second forward speed $2^{ND}$.

Figure 3B:
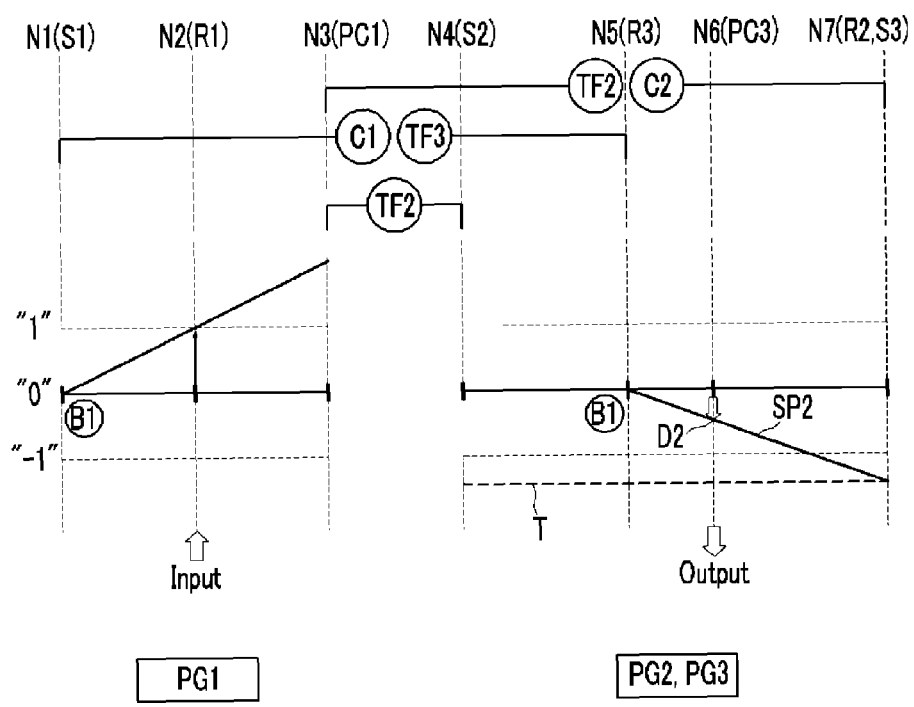
FIG. 3B is a lever diagram of an exemplary planetary gear train at the second forward speed according to the present invention.

As shown in FIG. 3B, the rotation speed of the first shaft IS1 is input to the second rotation element N2, and the first rotation element N1 and the fifth rotation element N5 are operated as fixed elements by operation of the first brake B1 and the first clutch C1.

Therefore, the rotation speed of the third rotation element N3 is decreased according to the gear ratio of the second transfer gear TF2 and is then input to the fourth rotation element N4 as an inverse rotation speed, and the second planetary gear set PG2 becomes a direct-coupling state by operation of the second clutch C2.

Therefore, the rotation elements of the third planetary gear set PG3 form a second shift line SP2 and D2 is output through the sixth rotation element N6 that is the output element.

At this time, the rotation elements of the second planetary gear set PG2 form a thick dotted line T, but it does not have any effect on shifting.

Third Forward Speed

The first brake B1 that was operated at the second forward speed $2^{ND}$ is released and the fourth clutch C4 is operated at the third forward speed $3^{RD}$.

Figure 3C:
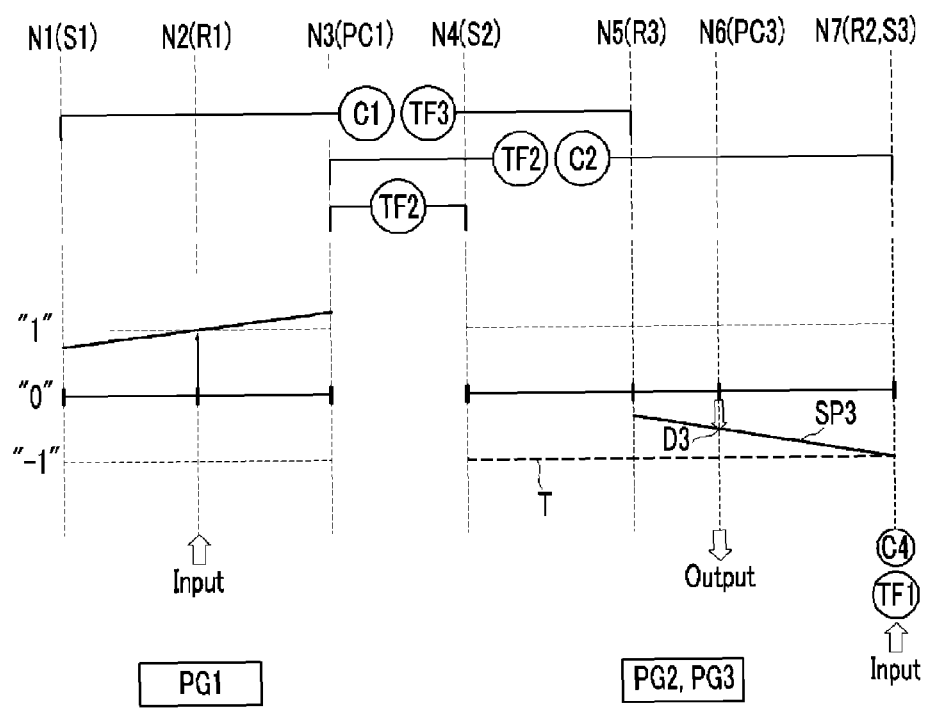
FIG. 3C is a lever diagram of an exemplary planetary gear train at the third forward speed according to the present invention.

As shown in FIG. 3C, the rotation speed of the first shaft IS1 is input to the second rotation element N2, the third rotation element N3 is connected to the fourth rotation element N4 through the second transfer gear TF2, the first rotation element N1 is connected to the fifth rotation element N5 through the third transfer gear TF3 by operation of the first clutch C1, and the second rotation element N2 is connected to the seventh rotation element N7 through the first transfer gear TF1 by operation of the fourth clutch C4.

Therefore, the rotation elements of the third planetary gear set PG3 form a third shift line SP3 and D3 is output through the sixth rotation element N6 that is the output element.

At this time, the rotation elements of the second planetary gear set PG2 form a thick dotted line T, but it does not have any effect on shifting.

Fourth Forward Speed

The fourth clutch C4 that was operated at the third forward speed $3^{RD}$ is released and the third clutch C3 is operated at the fourth forward speed $4^{TH}$.

Figure 3D:
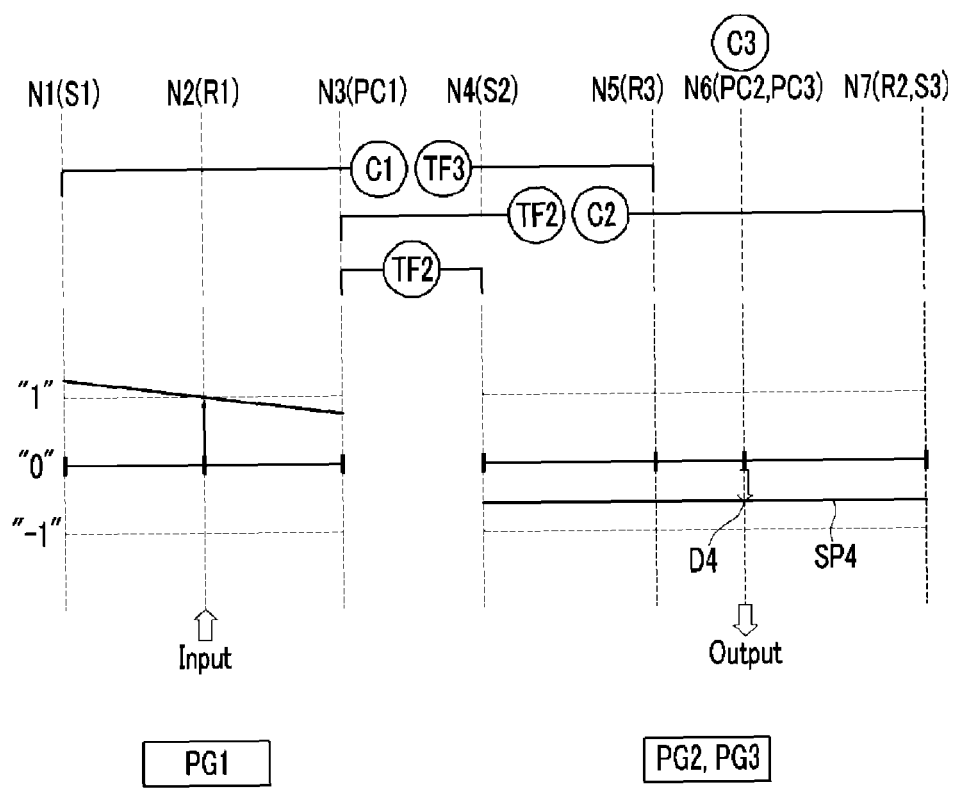
FIG. 3D is a lever diagram of an exemplary planetary gear train at the fourth forward speed according to the present invention.

As shown in FIG. 3D, the rotation speed of the first shaft IS1 is input to the second rotation element N2, the third rotation element N3 is connected to the fourth rotation element N4 through the second transfer gear TF2, the first rotation element N1 is connected to the fifth rotation element N5 through the third transfer gear TF3 by operation of the first clutch C1, and the third rotation element N3 is connected to the seventh rotation element N7 through the second transfer gear TF2 by operation of the second clutch C2.

Therefore, the second and third planetary gear sets PC2 and PC3 become direct-coupling state, the rotation elements of the second and third planetary gear sets PC2 and PC3 form a fourth shift line SP4, and D4 is output through the sixth rotation element N6 that is the output element.

Fifth Forward Speed

The second clutch C2 that was operated at the fourth forward speed $4^{TH}$ is released and the fourth clutch C4 is operated at the fifth forward speed $5^{TH}$.

Figure 3E:
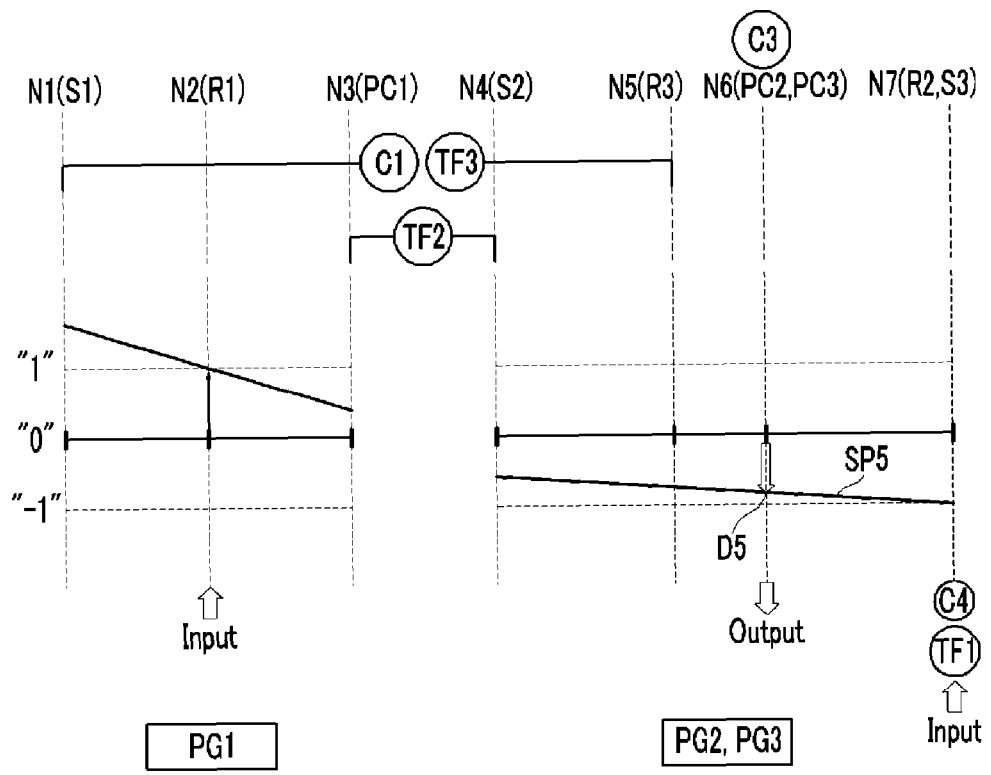
FIG. 3E is a lever diagram of an exemplary planetary gear train at the fifth forward speed according to the present invention.

As shown in FIG. 3E, the rotation speed of the first shaft IS1 is input to the second rotation element N2 and is input to the seventh rotation element N7 through the first transfer gear TF1 by operation of the fourth clutch C4.

In addition, the third rotation element N3 is connected to the fourth rotation element N4 through the second transfer gear TF2, and the first rotation element N1 is connected to the fifth rotation element N5 through the third transfer gear TF3 by operation of the first clutch C1.

Therefore, the rotation elements of the second and third planetary gear sets PG2 and PG3 form a fifth shift line SP5 and D5 is output through the sixth rotation element N6 that is the output element.

Sixth Forward Speed

The first clutch C1 that was operated at the fifth forward speed $5^{TH}$ is released and the second clutch C2 is operated at the sixth forward speed $6^{TH}$.

Figure 3F:
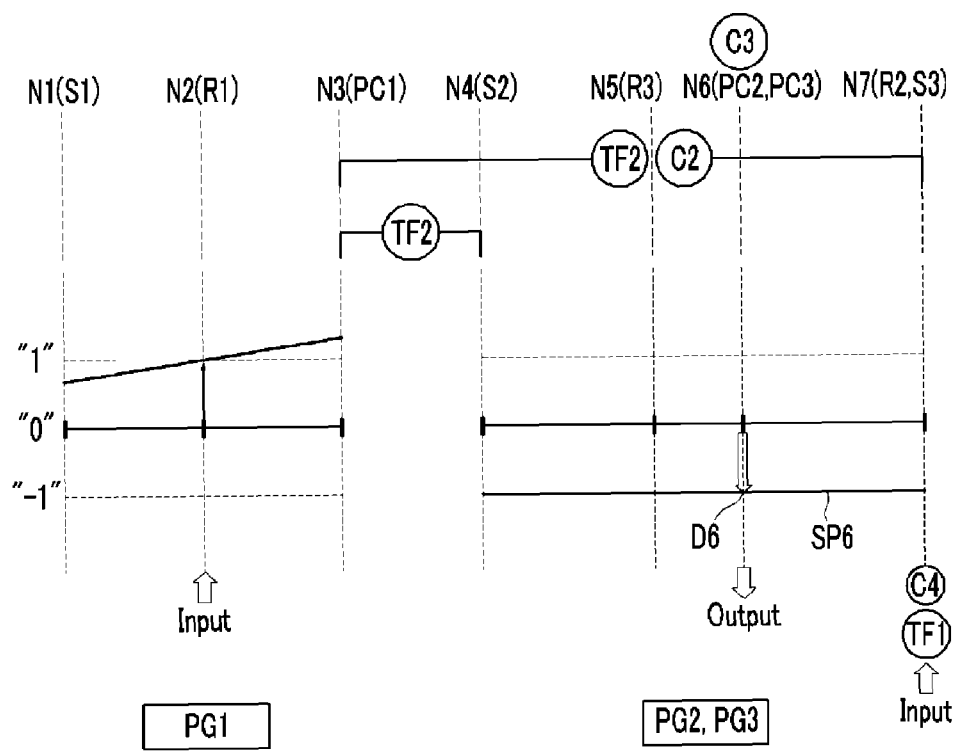
FIG. 3F is a lever diagram of an exemplary planetary gear train at the sixth forward speed according to the present invention.

As shown in FIG. 3F, the rotation speed of the first shaft IS1 is input to the second rotation element N2 and is input to the seventh rotation element N7 through the first transfer gear TF1 by operation of the fourth clutch C4.

In addition, the third rotation element N3 is connected to the fourth rotation element N4 through the second transfer gear TF2 and is connected to the seventh rotation element N7 by operation of the second clutch C2.

Therefore, the second and third planetary gear sets PC2 and PC3 become direct-coupling state, the rotation elements of the second and third planetary gear sets PC2 and PC3 form a sixth shift line SP6, and D6 is output through the sixth rotation element N6 that is the output element.

Seventh Forward Speed

The second clutch C2 that was operated at the sixth forward speed $6^{TH}$ is released and the first brake B1 is operated at the seventh forward speed $7^{TH}$.

Figure 3G:
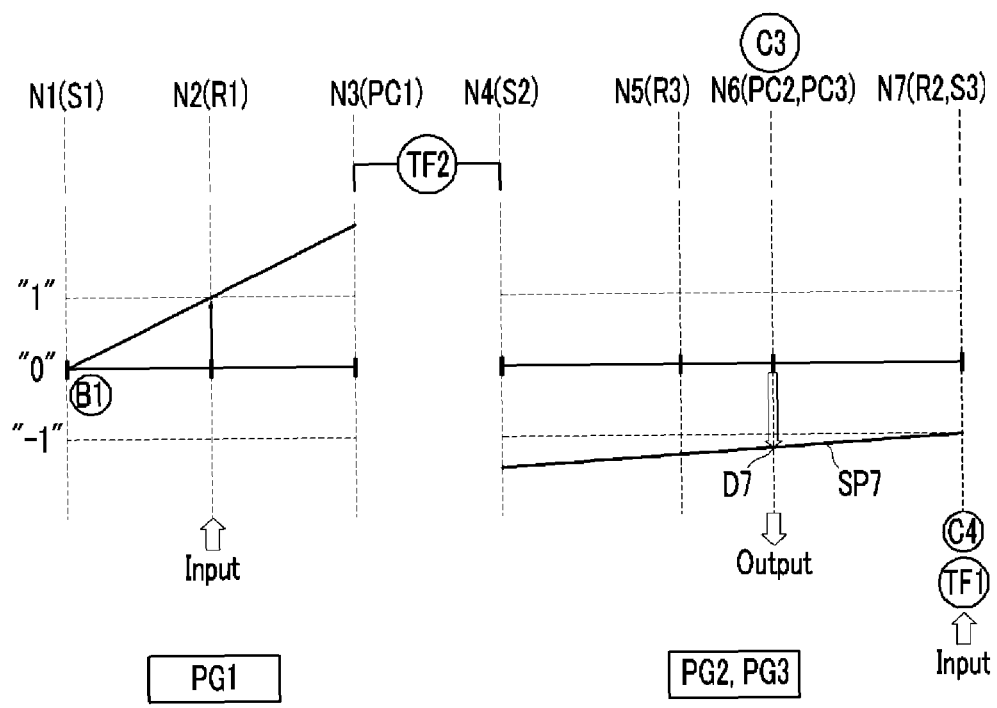
FIG. 3G is a lever diagram of an exemplary planetary gear train at the seventh forward speed according to the present invention.

As shown in FIG. 3G, the rotation speed of the first shaft IS1 is input to the second rotation element N2 and is input to the seventh rotation element N7 through the first transfer gear TF1 by operation of the fourth clutch C4, and the first rotation element N1 is operated as a fixed element by operation of the first brake B1.

In addition, the third rotation element N3 is connected to the fourth rotation element N4 through the second transfer gear TF2.

Therefore, the rotation elements of the second and third planetary gear sets PG2 and PG3 form a seventh shift line SP7 and D7 is output through the sixth rotation element N6 that is the output element.

Eighth Forward Speed

The fourth clutch C4 that was operated at the seventh forward speed $7^{TH}$ is released and the second clutch C2 is operated at the eighth forward speed $8^{TH}$.

Figure 3H:
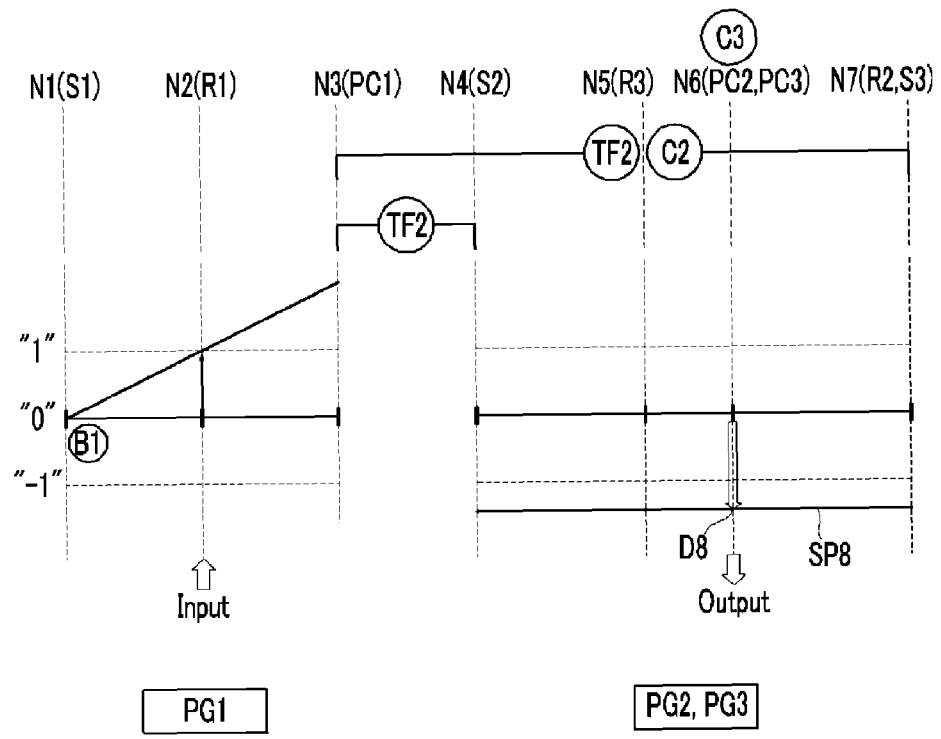
FIG. 3H is a lever diagram of an exemplary planetary gear train at the eighth forward speed according to the present invention.

As shown in FIG. 3H, the rotation speed of the first shaft IS1 is input to the second rotation element N2, and the first rotation element N1 is operated as a fixed element by operation of the first brake B1.

In addition, the third rotation element N3 is connected to the fourth rotation element N4 through the second transfer gear TF2 and is connected to the seventh rotation element N7 through the second transfer gear TF2 by operation of the second clutch C2.

Therefore, the second and third planetary gear sets PC2 and PC3 become direct-coupling state, the rotation elements of the second and third planetary gear sets PC2 and PC3 form an eighth shift line SP8, and D8 is output through the sixth rotation element N6 that is the output element.

Reverse Speed

As shown in FIG. 2, the first brake B1 and the first and third clutches C1 and C3 are operated at the reverse speed Rev.

Figure 3I:
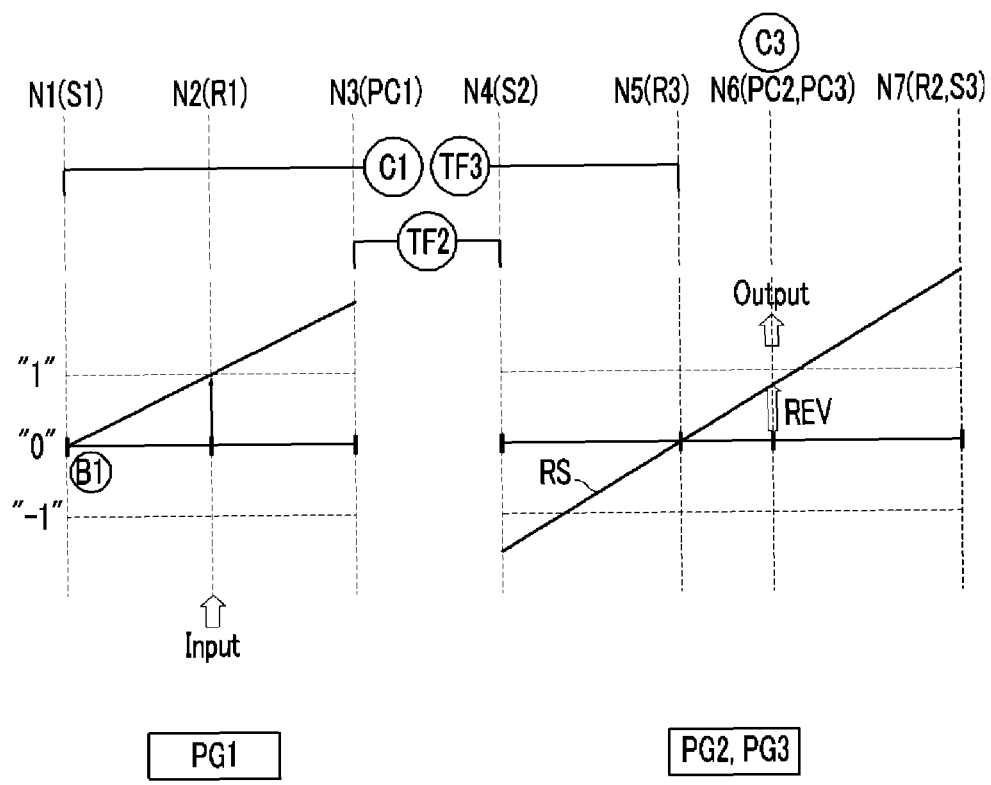
FIG. 3I is a lever diagram of an exemplary planetary gear train at a reverse speed according to the present invention.

As shown in FIG. 3I, the rotation speed of the first shaft IS1 is input to the second rotation element N2, and the first rotation element N1 and the fifth rotation element N5 are operated as fixed elements by operation of the first brake B1 and the first clutch C1.

In addition, the third rotation element N3 is connected to the fourth rotation element N4 through the second transfer gear TF2.

Therefore, the rotation elements of the second and third planetary gear sets PG2 and PG3 form a reverse shift line RS, and REV is output through the sixth rotation element N6 that is the output element.

Since three planetary gear sets are separately disposed on the first shaft and the second shaft disposed apart from and in parallel with each other in the planetary gear train according to various embodiments of the present invention, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance may be improved. Therefore, a start-up clutch instead of a torque converter may be used.

Since three frictional elements are operated at each shift-speed, non-operated frictional element may be minimized and drag torque may be reduced. In addition, fuel consumption may be reduced by increasing power delivery efficiency.

In addition, since torque load of each frictional element can be reduced, compact design is possible.

For convenience in explanation and accurate definition in the appended claims, the ten is upper or lower, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   a first shaft receiving torque of an engine;
   a second shaft parallel with the first shaft;
   a first planetary gear set on the first shaft including a first sun gear operated as an output element or a fixed element, a first planet carrier selectively operated as an output element, and a first ring gear directly connected to the first shaft and always operated as an input element as rotation elements thereof;
   a second planetary gear set on the second shaft including a second sun gear connected to the first planet carrier through an externally-meshed gear, a second planet carrier, and a second ring gear selectively connected to the first planet carrier and the first ring gear through externally-meshed gears as rotation elements thereof;
   a third planetary gear set on the second shaft including a third sun gear connected to the second ring gear, a third planet carrier selectively connected to the second planet carrier and directly connected to an output gear so as to be operated as an output element, and a third ring gear selectively connected to the first sun gear through an externally-meshed gear as rotation elements thereof;
   three transfer gears forming the externally-meshed gears; and
   frictional elements selectively interconnecting the rotation elements of the first, second, and third planetary gear sets or selectively connecting the rotation element to a transmission housing.

2. The planetary gear train of claim 1, wherein the first planetary gear set is a double pinion planetary gear set, and the second and third planetary gear sets are single pinion planetary gear sets.

3. The planetary gear train of claim 1, wherein the three transfer gears comprise:
   a first transfer gear connecting the first ring gear to the second ring gear;
   a second transfer gear connecting the first planet carrier directly to the second sun gear and selectively to the second ring gear; and
   a third transfer gear selectively connecting the first sun gear to the third ring gear.

4. The planetary gear train of claim 3, wherein the frictional elements comprise:
   a first brake disposed between the first sun gear and the transmission housing;
   a first clutch disposed between the first sun gear and the third transfer gear;
   a second clutch disposed between the second transfer gear and the second ring gear;
   a third clutch disposed between the second planet carrier and the third planet carrier; and
   a fourth clutch disposed between the first transfer gear and the second ring gear.

5. The planetary gear train of claim 4, wherein the first brake and the first and fourth clutches are operated at a first forward speed, the first brake and the first and second clutches are operated at a second forward speed, the first, second, and fourth clutches are operated at a third forward speed, the first, second, and third clutches are operated at a fourth forward speed, the first, third, and fourth clutches are operated at a fifth forward speed, the second, third, and fourth clutches are operated at a sixth forward speed, the first brake and the third and fourth clutches are operated at a seventh forward speed, the first brake and the second and third clutches are operated at an eighth forward speed, and the first brake and the first and third clutches are operated at a reverse speed.

6. A planetary gear train of an automatic transmission for a vehicle, comprising:

a first shaft receiving torque of an engine;

a second shaft parallel with the first shaft;

a first planetary gear set on the first shaft including a first sun gear operated as an output element or a fixed element, a first planet carrier selectively operated as an output element, and a first ring gear directly connected to the first shaft and always operated as an input element;

a second planetary gear set on the second shaft including a second sun gear connected to the first planet carrier, a second planet carrier, and a second ring gear selectively connected to the first planet carrier and the first ring gear;

a third planetary gear set on the second shaft including a third sun gear connected to the second ring gear, a third planet carrier selectively connected to the second planet carrier and directly connected to an output gear so as to be operated as an output element, and a third ring gear selectively connected to the first sun gear;

a first transfer gear connecting the first ring gear to the second ring gear;

a second transfer gear connecting the first planet carrier directly to the second sun gear and selectively to the second ring gear;

a third transfer gear selectively connecting the first sun gear to the third ring gear;

a first brake disposed between the first sun gear and the transmission housing;

a first clutch disposed between the first sun gear and the third transfer gear;

a second clutch disposed between the second transfer gear and the second ring gear;

a third clutch disposed between the second planet carrier and the third planet carrier; and a fourth clutch disposed between the first transfer gear and the second ring gear.

7. The planetary gear train of claim 6, wherein the first planetary gear set is a double pinion planetary gear set, and the second and third planetary gear sets are single pinion planetary gear sets.

8. The planetary gear train of claim 6, wherein the first brake and the first and fourth clutches are operated at a first forward speed, the first brake and the first and second clutches are operated at a second forward speed, the first, second, and fourth clutches are operated at a third forward speed, the first, second, and third clutches are operated at a fourth forward speed, the first, third, and fourth clutches are operated at a fifth forward speed, the second, third, and fourth clutches are operated at a sixth forward speed, the first brake and the third and fourth clutches are operated at a seventh forward speed, the first brake and the second and third clutches are operated at an eighth forward speed, and the first brake and the first and third clutches are operated at a reverse speed.

\* \* \* \* \*